United States Patent Office 3,238,444
Patented Mar. 1, 1966

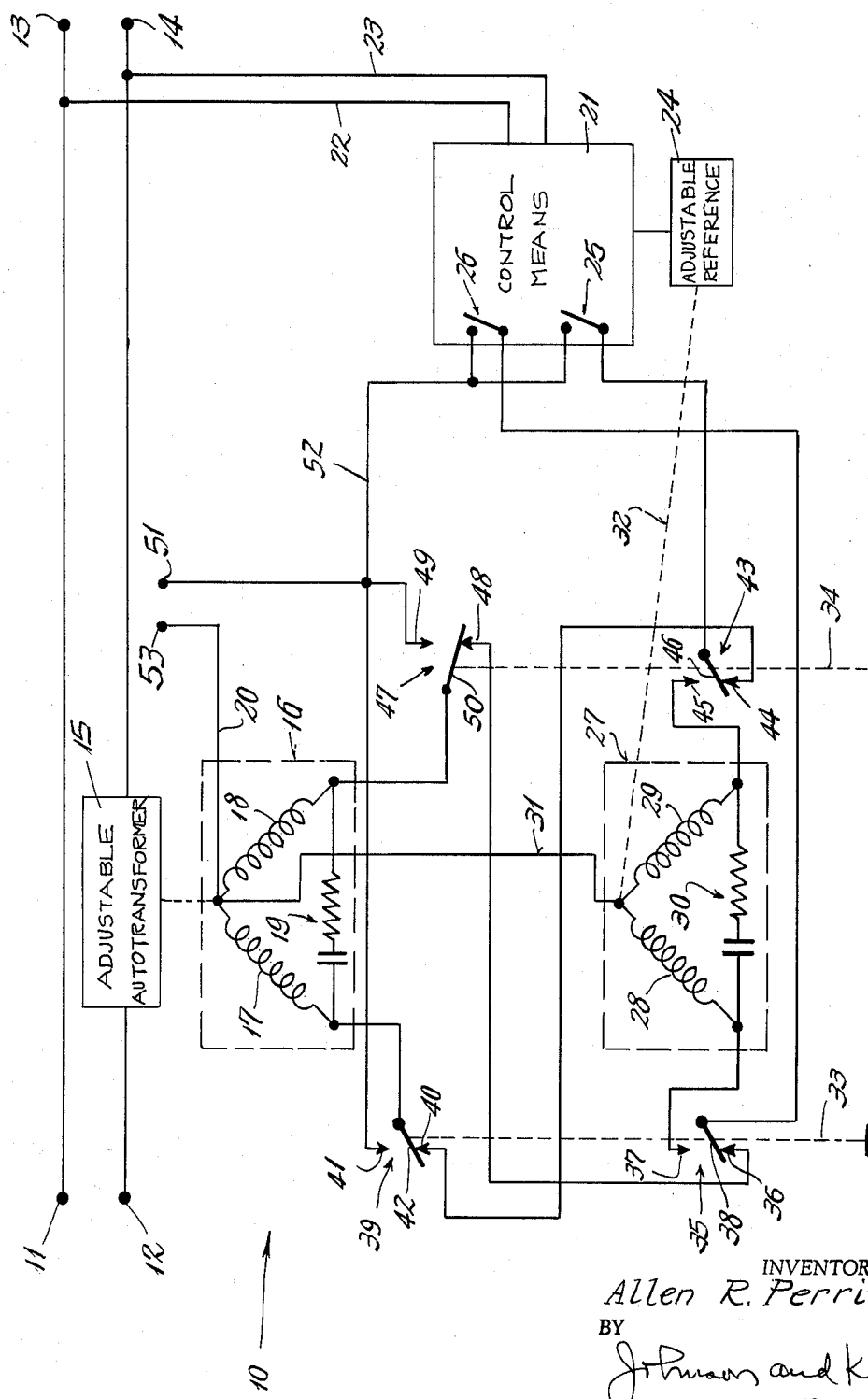

3,238,444
ADJUSTABLE POWER REGULATOR
Allen R. Perrins, Cheshire, Conn., assignor to The Superior Electric Company, Bristol, Conn., a corporation of Connecticut
Filed Dec. 13, 1962, Ser. No. 244,439
3 Claims. (Cl. 323—66)

The present invention relates to a regulator for regulating the electrical energy to ouput terminals to maintain a selected value of output power and more particularly to such a regulator in which the selected value may be adjusted.

In electrical power regulators there is generally connected between their input and output terminals a regulator means for maintaining the output power at a selected value and a means for controlling the regulator means. Also it is common to provide for adjusting or altering the selected value of output power and this is usually accomplished by the manual manipulation of an adjusting element, such as a potentiometer. However, in certain instances it is desirable to provide for the manual controls of the adjusting element to be located remotely from the adjusted element and hence there may be provided an electrical motor or other actuating means which is controlled by the manual controls to enable the adjusting. Moreover, such a power regulator may further include a motor that serves to automatically actuate the regulator means. Normally, in regulators having both an adjusting motor and a regulating motor, the regulator means has much greater inertia and mass, requires more power, and is slower moving in addition to being more subject to detriment by stopping and starting than the adjusting motor which may be small, relatively rapidly moving and capable of withstanding jogging or other rapid on-off or reverse movement.

With this type of regulator wherein the manual controls operate the adjusting motor, it has been found that not completely satisfactory operation occurs when the selected value of output power is being changed. Thus, for example, if the adjusting motor when operated alters the selected value of output power faster than the regulating motor can alter the actual output power then the value of the actual output power trails the selected value of output power and thus the operator is incapable of determining the selected value of output power when it has stopped changing by observing the value of the actual output power. If, on the other hand, the adjusting motor is slower in changing the value of selected output power than the regulating motor is in changing the actual output power, then the latter is caused to jog, being subject to abrupt stopping and starting which has been found undesirable. Moreover, as the actual output voltage depends upon indeterminate variables, it is accordingly difficult, if not impossible, to make the changing of their respective values of output power be exactly the same.

It is accordingly an object of the present invention to provide in an automatic power regulator of the type having a relatively slow, large, regulator means including a regulating motor and an adjustable means including a small, relatively fast, adjusting motor for obviating the above disadvantages in this heretofore known type of power regulator.

Another object of the present invention is to provide in an adjustable power regulator for the manual control of the regulating motor and the automatic control of the adjusting motor during changes in the selected value of the output power.

A further object of the present invention is to provide an adjustable power regulator of the above type which is durable in use, simple in construction and relatively economical to manufacture.

In carrying out the present invention there is provided a power regulator which includes a regulator means positioned between input and output terminals for maintaining at the output terminals a selected value of output power. In the particular embodiment herein described the regulator means consists essentially of an adjustable voltage autotransformer with the autotransformer being actuated by a reversible electric motor, the regulating motor. For controlling the actuation of the motor the power regulator includes a control means which senses the value of actual output power and compares it against what may be termed an adjustable reference and if there is a difference the control means actuates the regulating motor to cause the autotransformer to change the output power to eliminate the difference between the actual output power and that which is selected by the adjustable reference.

In order to provide for adjusting the output power, the reference which may contain a potentiometer or other adjustable device, is actuated by another reversible electric motor, the adjusting motor. While normally manual controls would serve to actuate the regulating motor, in the present embodiment upon operation of manual controls to either raise or lower the selected value of output power, the control means output is disconnected from the regulating motor and allows the regulating motor to be actuated directly from a source of manually controlled electrical energy. Moreover, in order to cause the adjusting motor to be actuated to effect the setting of the reference at the new selected value, the signals from the control circuit are connected to the adjusting motor and it is actuated according to the signals.

It will thus be seen that when the manual controls are operated to change the selected value of output power, the relatively slow moving, high mass and inertia regulator means and regulating motor is caused to move at a determined rate by being separately energized from a source of electrical energy while the fast, small, quickly responsive adjusting motor is driven by the control means to closely follow, as by jogging, the actual output voltage. Upon attaining the new selected value of output power, as by observation of a meter measuring the actual output power, the operator releases the manual controls and then stops energization of the regulating motor. As the adjusting motor has been actuated by the control means to closely follow the actual output voltage, it will, upon stopping of the regulating motor, have set the reference to be at the new selected value of output power. The normal operation of the regulator at the new selected value of output power value is effected with the reconnecting of the control means to supply its signals to the regulating motor and the deenergization of the adjusting motor from the control means by the release of the manual controls.

Other features and advantages will hereinafter appear.

The only figure in the drawing is a schematic and block diagram of an adjustable automatic power regulator of the present invention.

In the drawings, the adjustable automatic power regulator is generally indicated by the reference numeral 10 and includes a pair of electrical input terminals 11 and 12 and a pair of electrical output terminals 13 and 14. While the present invention may employ as a regulator means mechanically adjustable inductances, resistors or other electrical power controlling devices, in the particular embodiment of the invention herein described the regulator means is an adjustable voltage autotransformer 15 connected in the line between the input terminal 12 and the output terminal 14 with the terminals 11 and 13 being common. The regulator means 15 is actuated by an electrically energized reversible power device, herein specifically shown as a reversible electric motor 16 having a winding 17, which when energized with inphase A.C.

current, effects an increase of the output power of the regulator, while if the other winding 18 is energized with inphase A.C. current, the autotransformer is actuated to decrease the output power. With this type of motor, a phase shifting network 19 is employed as is a lead 20, common to both windings.

For controlling the actuation of the reversible electric motor 16 during normal operation of the regulator in order to maintain the output power at a selected value, there is provided a control means 21 connnected as by leads 22 and 23 to the output terminals to receive a signal indicative of the actual output power. In addition there is provided an adjustable reference 24 that produces an electrical quantity which is compared to the quantity produced by the leads 22 and 23. By comparing the electrical quantity from the leads 22 and 23 with the quantity from the adjustable reference 24, the control means may actuate either an increasing switch means 25 or a decreasing switch means 26. If there is substantially no difference between the actual output power quantity in the leads 22 and 23 and the adjustable reference quantity neither switch means 25 nor 26 is energized while if the actual output power quantity is less than that of the adjustable reference quantity, the switch means 25 is energized to a closed position to effect increasing of the output power while in the opposite condition where the actual output power is more than the reference quantity, then the switch 26 is closed, causing a decrease in the output power of the regulator.

It will be appreciated that the regulator may measure either current or voltage or their combination and thus is referred to herein generally as a power regulator while the adjustable reference may also provide either current, voltage, their combination or either electrical quantity but which has a value that selects the output power that is maintained by the regulator. The control means and the adjustable reference are herein shown in block form and may be of any of several structures that are well known. However the reference 24 must set the selected value at which the actual output power is to be maintained and it must also be mechanically adjusted to permit changing of the selected value. In addition the control means 21 may employ a single output providing two different signals instead of switch means 25 and 26, one signal being produced only upon the value of the actual power exceeding the selected value as determined by the reference and the other only being produced when the value of the actual power is less than the selected value as determined by the reference and in which the value of the signal may be related to the error to control the movement of the regulating motor. While the adjustable reference may be included in the control means, in the drawing it is shown separate therefrom but electrically connected thereto.

In the regulator 10, the adjustable reference 24 is capable of being changed so that the selected value of the output power which the regulator maintains may be adjusted. This is effected by the employment of a reversible, adjusting motor 27 which has an increasing winding 28, a decreasing winding 29, a phase shifting network 30 and a common lead 31. The adjusting motor is mechanically coupled to the adjustable reference 24 as indicated by the dotted line 32, so that actuation of the motor will change the reference. The adjusting motor 27 effects an increase in the selected value of the reference by inphase A.C. energization of the winding 28 while inphase energization of the winding 29 causes a decrease in the selected value.

To change the selected value produced by the reference by energization of the motor 27, there is provided an increase controller 33 and a decrease controller 34, both being herein shown as manually manipulatable. The increase controller is connected to operate a single pole, double throw switch 35 having a normally closed contact 36, a normally open contact 37 and an arm 38 and to also operate another single pole, double throw switch 39 having a normally closed contact 40, a normally open contact 41 and an arm 42. The decreasing controller is connected to operate a single pole, double throw switch 43 having a normally closed contact 44, a normally open contact 45 and an arm 46 and to also operate another single pole, double throw switch 47 having a normally closed contact 48, a normally open contact 49 and a switch arm 50.

With the elements being in the solid position shown in the drawing, the regulator 10 functions to automatically maintain the output power at a value that has been selected by the adjustable reference. Thus if the output power decreases beyond this value, the switch 25 is closed causing current to flow from a terminal 51 that is connectible to a source of A.C. through a lead 52, switch 25, arm 46, contact 44, contact 40, arm 42 to the increase winding 17 of the motor 16 to thereby cause the adjustable autotransformer to increase the output power. Upon the output power achieving the value selected by the reference, the switch 25 opens, ceasing energization of the motor 16. Similarly if the output power is above the selected value, the switch 26 closes causing current to flow from the terminal 51, lead 52, switch 26, switch arm 38, contact 36, contact 48 and arm 50 to the decreasing winding 18 to cause the output power to be decreased until the switch 26 opens which occurs when the output power has achieved the value selected by the reference. Another input terminal 53 is connected to the common leads 31 and 20. If both the power being regulated has the same characteristics as the source to which terminals 51 and 53 are connected and which is required for the motors, then it is within the scope of the present invention to connect the terminals 51 and 53 to the input terminals 11 and 12.

When it is desired to change the selected value of output power, according to the present invention, the circuitry heretofore described provides for continuous energization of the motor 16 while either controller 33 or 34 is operated and for shifting the control from the control means effected by closure of the switches 25 and 26 to the adjusting motor 27. Thus, upon operation of the increase controller 33 to increase the selected value of output power, the switch arm 38 is actuated to engage normally open contact 37 and switch arm 42 to engage contact 41. This causes energization of the increasing winding 17 of the regulating motor 16 through terminal 51, contact 41 and switch arm 42. As soon as the actual output power begins to increase in value, the control means signals to decrease the output power to that selected value set by the reference 24 and accordingly closes switch 26. This causes energization of the adjusting motor 27 through the switch 26, switch arm 38 and contact 37 and thus the increase winding 28 has inphase A.C. impressed thereon which causes it to increase the selected value of the reference.

As the adjusting motor 27 is relatively small and faster in response to changing the selected value of the reference than the regulating motor 16 is in changing the actual power, the reference will quickly make the selected value substantially equal to the actual output power. This causes opening of the switch 26 and ceases energization of the adjusting motor. However, upon continued operation of the increasing controller, the above steps continue with the adjusting motor continually being jogged to increase the selected value of the reference to maintain it substantially that of the actual output power. Upon the actual output power attaining the new desired value, as may be observed by appropriate indicators connected to the output terminals 13 and 14, the operator can then release the increase controller, causing the parts to assume the position shown in the drawing wherein the control means controls the regulating motor 16 to maintain the actual output power at the new selected value.

If, on the other hand, the decreasing controller 34 is operated to decrease the selected value of output power, switch arm 46 engages normally open contact 45 and switch arm 50 engages contact 49. This causes the regulating motor 16 to have its decrease winding 18 energized by terminal 51, contact 49 and switch arm 50 which decreases the actual output power and causes subsequent closure of increase switch means 25. Accordingly through closed switch means 25, switch arm 46 and contact 45, the decreasing winding 29 of the adjusting motor 27 is energized with inphase A.C. to cause the selected value of the reference to decrease. As the actual output power decreases, the adjustable motor is continually jogged by opening and closing of switch means 25 to maintain the selected value substantially that of the actual value. Upon the actual output power achieving the new value, the decreased controller is released enabling the circuit to again resume its normal operation of the control means controlling the regulating motor 16.

It will be appreciated that with the present construction when the regulating motor is a large motor controlling a relatively large autotransformer or other large mass and inertia regulator means, and the adjusting motor is a small motor controlling only, for example, a small adjustable potentiometer and with a faster speed of response that the adjusting motor is more capable of withstanding abrupt starting or stopping with much less detriment thereto than would be the motor 16 and the regulator means 15. Moreover, the value of the selected output power of the reference 24 will be made to closely follow that of the actual output power when changing because of the faster speed of response of the adjusting motor to change the selected value with respect to the speed that the regulating motor changes the actual value. While a small difference may exist, this may be minimized by increasing the sensitivity of the control means, if found desirable. Thus when the operator achieves a value of actual output power which is that desired, the reference within the sensitivity of the control means also produces a selected value of output power which substantially approximates the actual and thus causes the actual output power to be maintained at that new value which the operator desired.

Thus the present invention provides in an automatic voltage regulator wherein there is a motor for actuating the regulator means and an adjusting motor for changing the selected value of output power. This is effected during the changing by disconnecting the control of the control means on the regulating motor and permitting it to be continuously energized while the adjusting motor which normally is not energized is connected to be controlled by the control means. By the use of such structure, not only is the above-noted close following of the selected value of output power of the reference to the actual value of output power achieved with a smooth changing of the output power but moreover there is obviated detrimental stopping and starting movement of the regulating motor and regulator means with any stopping and starting or jogging movement occurring in the small, quickly responsive, low inertia adjusting motor and adjusting means.

Variations and modifications may be made within the scope of the claims and portions of the improvements may be used without others.

I claim:
1. An automatic power regulator having input terminals adapted to be connected to a source of electrical energy and output terminals for supplying a selectable value of output power which is maintained substantially constant comprising adjustable regulator means for regulating the power between the input and output terminals and including an adjusting regulating motor actuatable by a signal for adjusting the regulating means; control means for sensing the actual value of output power and providing a signal to actuate the regulating motor to cause the regulating means to effect maintenance of the selected value of output power upon deviation of the value of actual power at the output terminals from the selected value, said control means including adjustable means for adjusting the selected value and an adjusting motor for operating said adjustable means; manipulatable means for changing the selected value of output power, said manipulatable means including means for disconnecting the regulating means from the signal of the control means, means for independently actuating the regulating motor and means for connecting the adjusting motor to receive the signal from the control means to be controlled thereby, whereby upon operation of the manipulatable means, the regulating motor is continuously actuated to cause the actual value of output power to change while the adjusting motor is actuated by the control means to adjust the adjustable means to have substantially the same selected value of output power as the actual value of output power; and in which the regulating motor changes the actual value of output power at a slower speed than the adjusting motor adjusts the selected value of output power.

2. The invention as defined in claim 1 in which the manipulatable means includes an increasing controller means and a decreasing controller means, each being independently operable.

3. The invention as defined in claim 2 in which the control means includes an increasing switch means and a decreasing switch means, and the increasing and decreasing controller means each includes a normally open switch connected between the regulating motor and the source of electrical energy.

References Cited by the Examiner
UNITED STATES PATENTS

| 2,786,973 | 3/1957 | Kutfler | 318—19 |
| 2,871,437 | 1/1959 | Stringer | 321—18 |
| 3,098,194 | 7/1963 | Clemens | 323—66 |

LLOYD McCOLLUM, *Primary Examiner.*

A. D. PELLINEN, D. L. RAE, *Assistant Examiners.*